US009873979B2

(12) United States Patent
Roeseler

(10) Patent No.: US 9,873,979 B2
(45) Date of Patent: Jan. 23, 2018

(54) HOLLOW-BRAIDED ROPE HAVING A ROPE TERMINATION FORMED THEREIN AND A ROPE TERMINATION FORMING SYSTEM FOR FORMING THE ROPE TERMINATION

(71) Applicant: Hood Technology Corporation, Hood River, OR (US)

(72) Inventor: Corydon C. Roeseler, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 344 days.

(21) Appl. No.: 14/716,514

(22) Filed: May 19, 2015

(65) Prior Publication Data

US 2015/0368860 A1    Dec. 24, 2015

Related U.S. Application Data

(60) Provisional application No. 62/014,351, filed on Jun. 19, 2014.

(51) Int. Cl.
 *D07B 1/12*  (2006.01)
 *D07B 9/00*  (2006.01)
 (Continued)

(52) U.S. Cl.
 CPC ............ *D07B 1/12* (2013.01); *D07B 1/14* (2013.01); *D07B 1/18* (2013.01); *D07B 9/00* (2013.01); *Y10T 29/5367* (2015.01)

(58) Field of Classification Search
 CPC ... D07B 1/12; D07B 1/14; D07B 1/18; D07B 9/00
 See application file for complete search history.

(56) References Cited

U.S. PATENT DOCUMENTS

| 2,143,985 | A | | 1/1939 | Kellems | |
| 3,220,074 | A | * | 11/1965 | Ehmann | D07B 1/167 24/115 M |

(Continued)

FOREIGN PATENT DOCUMENTS

| DE | 2418880 | 10/1975 |
| EP | 1 639 270 | 7/2011 |

(Continued)

OTHER PUBLICATIONS

Applied Fiber—Fiber Rope Termination, webpage, available at http://wvvw.applied-fiber.com/fiber-rope-termination, available before Jun. 19, 2014 (2 pages).

(Continued)

*Primary Examiner* — Shaun R Hurley
(74) *Attorney, Agent, or Firm* — Neal, Gerber & Eisenberg LLP

(57) ABSTRACT

Various embodiments of the present disclosure provide a hollow-braided rope having a new and improved rope termination formed therein and a new and improved rope termination system for forming the rope termination. Generally, the rope termination of the present disclosure is formed using a double-braided portion of hollow-braided rope in conjunction with a set of mechanical components of the rope termination forming system. The use of both the double-braided portion of the hollow-braided rope and the set of mechanical components causes any applied tensile forces to be distributed between the double-braided portion and the mechanical components. The distribution of part of any applied tensile forces away from the mechanical components and to the double-braided portion of the hollow-braided rope itself enables the mechanical components to be relatively small and lightweight and reduces the size and (Continued)

weight of the rope termination without compromising strength.

17 Claims, 14 Drawing Sheets

(51) Int. Cl.
*D07B 1/18* (2006.01)
*D07B 1/14* (2006.01)

(56) References Cited

U.S. PATENT DOCUMENTS

| | | |
|---|---|---|
| 3,475,795 A | 11/1969 | Youngblood |
| 4,507,008 A | 3/1985 | Adl et al. |
| 4,755,076 A | 7/1988 | Salama et al. |
| 5,904,438 A | 5/1999 | Vaseghi et al. |
| 6,425,338 B1 | 7/2002 | Stevenson |
| 7,451,527 B2 | 11/2008 | Pearce et al. |
| 8,567,015 B2 | 10/2013 | Ward et al. |
| 2011/0283484 A1 | 11/2011 | Hall et al. |

FOREIGN PATENT DOCUMENTS

| | | | | |
|---|---|---|---|---|
| FR | 2470302 A | * | 6/1981 | |
| GB | 2175623 A | * | 12/1986 | ............. B63B 21/56 |
| SU | 846890 | | 7/1981 | |
| WO | WO 1989/008210 | | 9/1989 | |

OTHER PUBLICATIONS

Garland, John J. et al., "Running Lines and End Connectors for Synthetic Rope to Reduce Logging Workloads," Oregon Occupational Safety and Health Administration Worksite Redesign Grant Final Report, Jul. 2004, available at http://www.orosha.org/grants/osuforest/osu/runninglines.pdf (77 pages).

"Parafil The Ultimate Syntheic Rope," webpage, available at http://linearcomposites.net/?pageid=Parafil.xml, Sep. 20, 2013 (2 pages).

Parafil Rope Terminations, webpage, available at http://www.fitzroy.com/ian/phd/index.php, May 9, 2012 (8 pages).

Wire Rope Terminations, Certex, available at http://www.certex.com/assets/wire-rope-terminations.pdf, available before Jun. 19, 2014 (33 pages).

International Search Report and Written Opinion for International Application No. PCT/US15/32465 dated Aug. 14, 2015 (9 pages).

* cited by examiner

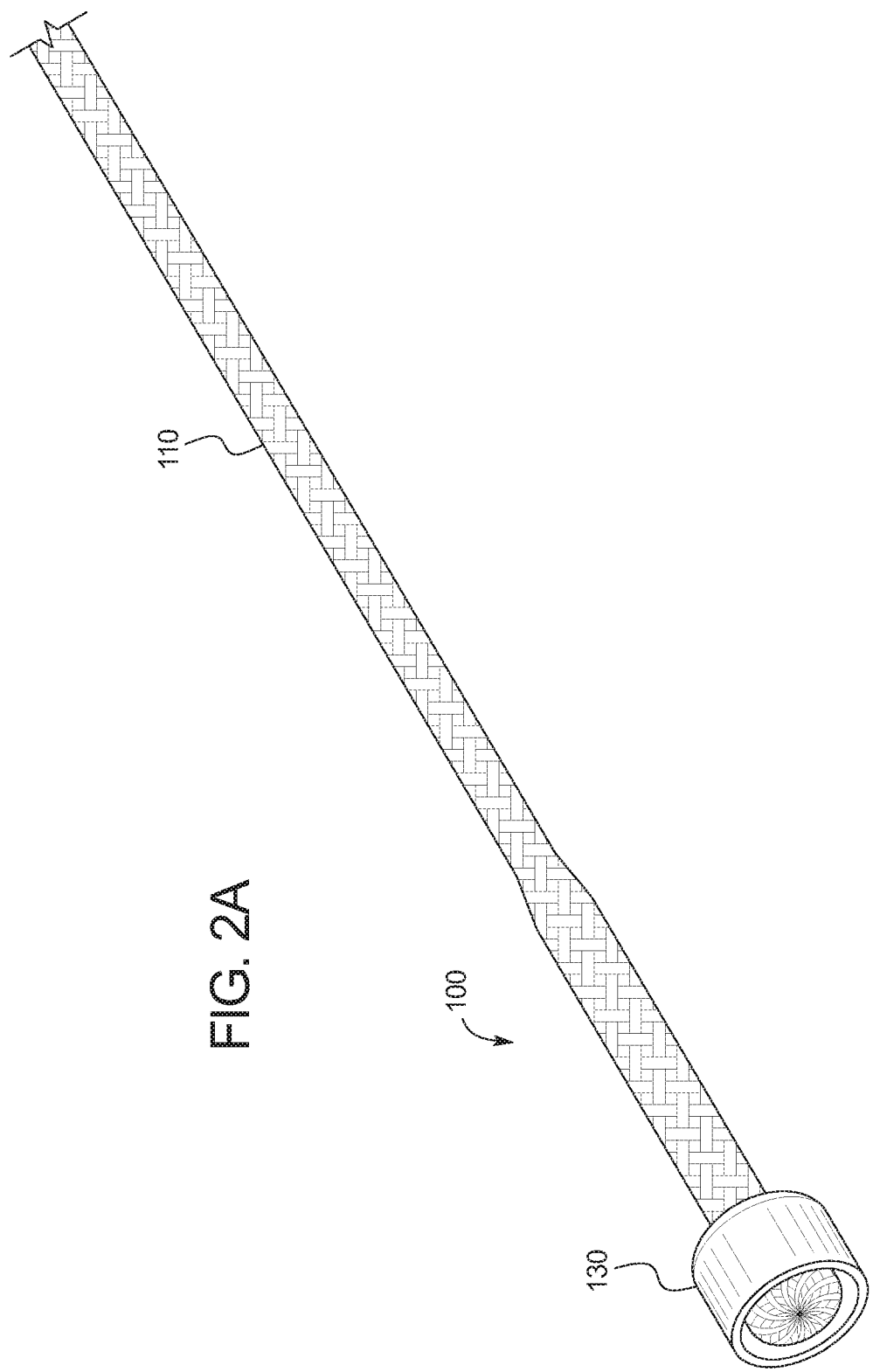

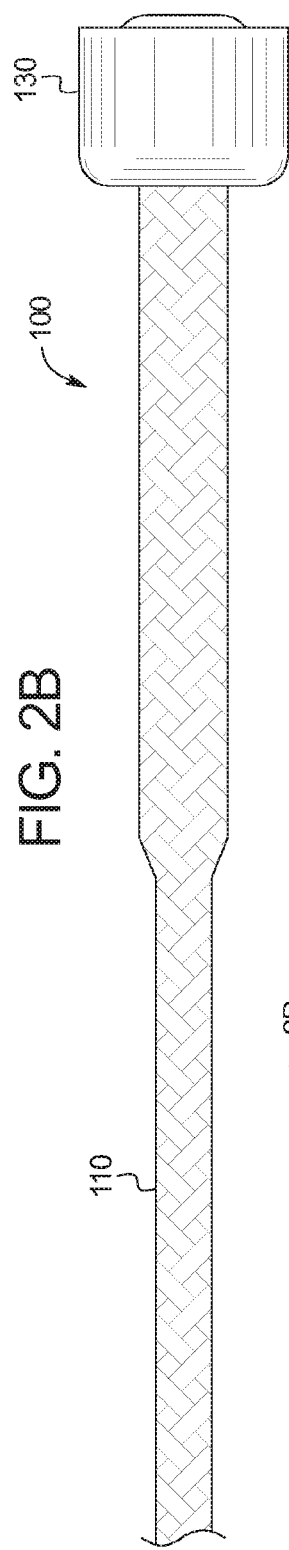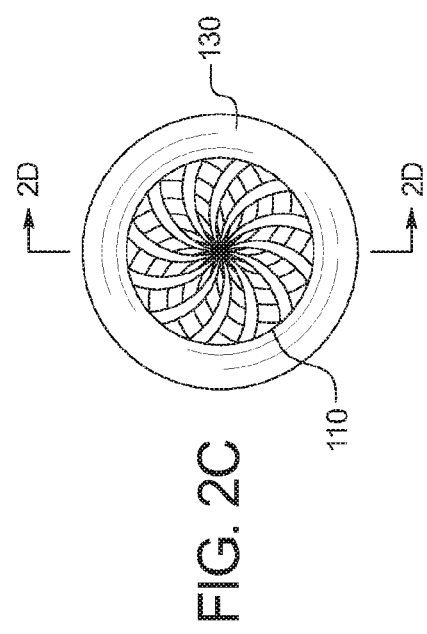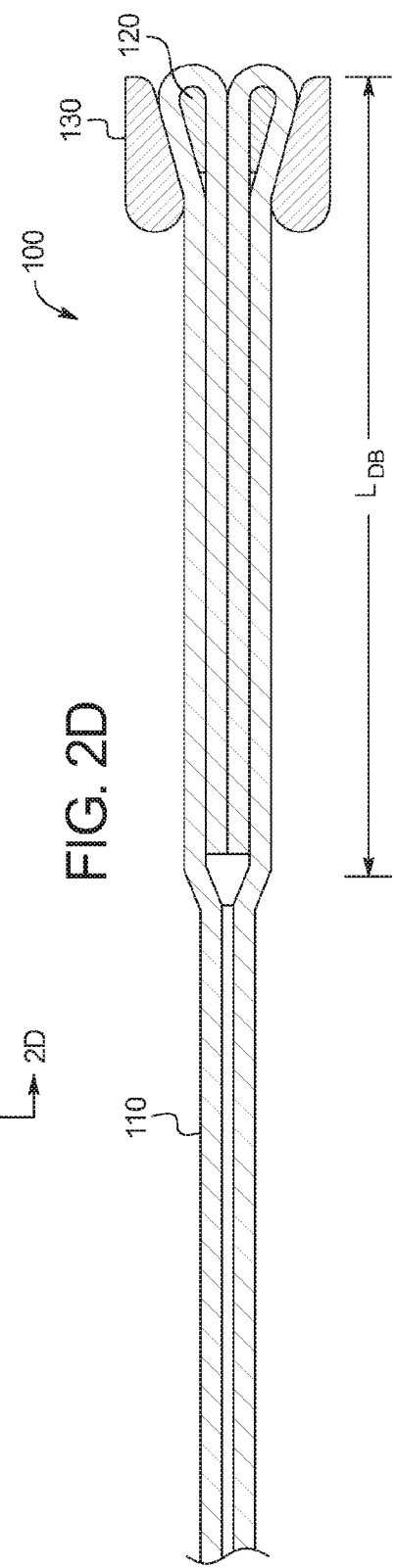
FIG. 2B
FIG. 2C
FIG. 2D

HOLLOW-BRAIDED ROPE HAVING A ROPE TERMINATION FORMED THEREIN AND A ROPE TERMINATION FORMING SYSTEM FOR FORMING THE ROPE TERMINATION

PRIORITY CLAIM

This application claims priority to and the benefit of U.S. Provisional Patent Application Ser. No. 62/014,351, filed on Jun. 19, 2014, the entire contents of which are incorporated herein by reference.

BACKGROUND

Ropes are well known and are widely used to carry tensile loads in a variety of applications. Generally, a rope is formed by: (1) twisting or braiding individual fibers together to form individual strands, and (2) twisting or braiding the individual strands together to form the rope. The rope is thus formed from multiple interwoven strands of multiple interwoven fibers. One type of rope is hollow-braided rope. Generally, a hollow-braided rope includes an even number of strands (such as twelve strands) braided together in a helical pattern with half of the strands braided clockwise and the other half braided counter-clockwise. A cavity or void exists within a hollow-braided rope along the hollow-braided rope's longitudinal axis.

Rope terminations (also called rope terminators) are also well known. Rope terminations are formed at the ends of a rope and: (1) ensure that the strands of the rope do not unravel, and (2) enable the rope to be connected to an appropriate device or apparatus, such as the piston of a pneumatic air vehicle launcher, a hook, a winch drum, a brake lever, a turnbuckle, and the like. Certain known rope terminations are formed using the rope itself in combination with one or more additional mechanical components, while other known rope terminations are formed using the rope itself without employing any additional mechanical components.

One known type of rope termination that is formed using the rope itself in combination with additional mechanical components is a cup-and-cone rope termination (also called a spike-and-socket rope termination or a barrel-and-spike rope termination). Generally, in a cup-and-cone rope termination, the strands and fibers of a portion of the rope are clamped between two mechanical components as a tensile force is applied. FIG. 1A shows a cross-sectional view of one known cup-and-cone rope termination 10 formed at an end of a rope 15. This known cup-and-cone rope termination 10 includes: (a) a rigid cone 20 including a tapered outer surface; and (b) a rigid cup 30 including a generally cylindrical outer surface and a tapered, frustoconical inner surface having a cone angle $\alpha$ and defining a tapered bore through the cup 30. The inner surface of the cup 30 forms a cone receiving cavity configured to receive the cone 20, as described below.

To form this known cup-and-cone rope termination 10, a manufacturer: (1) threads a tail of the rope 15 into the tapered bore of the cup 30 through the smaller diameter opening, threads the tail through the tapered bore of the cup 30, and threads the tail out of the tapered bore of the cup 30 through the larger diameter opening; (2) inserts the cone 20, pointed end first, inside the tail of the rope 15 until the strands and fibers of a portion of the rope substantially surround and cover the outer surface of the cone 20; and (3) applies a tensile force to the cup 30 toward the tail of the rope 15 to cause: (i) the cone 20 to be received in the cone receiving cavity of the cup 30, (ii) the strands and fibers of the of the portion of the rope 15 surrounding the cone 20 to be clamped between the outer surface of the cone 20 and the inner surface of the cup 30, and (iii) the cup 30 to be locked in place.

Known cup-and-cone rope terminations have a variety of disadvantages. One disadvantage is that the cup of a typical cup-and-cone rope termination is made of heavy, thick-walled material. Specifically, cup-and-cone rope terminations require relatively shallow cone angles (e.g., the cone angle $\alpha$ indicated in FIG. 1A) to ensure that the cup and the cone components sufficiently clamp the strands and fibers of the portion of the rope therebetween. Generally, the shallower the cone angle, the more securely the cup and cone clamp the strands and fibers of the rope therebetween.

However, this large clamping force comes at a cost. Specifically, the shallower cone angles transmit increased radial loads to the cup as a tensile force is applied, and this radial load creates hoop stress in the cup wall. The ratio of cup radial load to rope tensile force for typical cup-and-cone rope terminations is about 10:1. That is, with the cup pulling against the rope (as in a typical rope termination), a 1 pound tensile force causes the cup to experience about a 10 pound radial load. The radial load is carried via hoop tension field, the details of which depend on wall thickness details of the cup. Thus, to successfully carry the large radial loads, the cup is typically made of heavy, thick-walled material such as carbon steel or stainless steel. This renders the use of the cup-and-cone rope termination particularly problematic in applications in which a rope (and any rope termination formed therein) having low mass is desired, such as in aeronautical or fast/dynamic applications.

Over the past few decades, ropes made of strands having fibers made of lightweight, synthetic materials (such as SPECTRA® (SPECTRA® is owned by Honeywell International Inc.); KEVLAR® (KEVLAR® is owned by E. I. du Pont de Nemours and Company); and VECTRAN® (VECTRAN® is owned by Kuraray Co., Ltd.)) have replaced ropes made of strands having fibers made of heavier materials, such as steel, for many applications. Since these lightweight synthetic fibers are slipperier than traditional steel fibers, cup-and-cone rope terminations having even shallower cone angles must be used to ensure that these slippery rope fibers are properly clamped between the cup and the cone. The shallower cone angle requires the use of an even heavier, thicker-walled cup that can withstand the hoop stresses caused by the shallower cone angle and the corresponding larger radial load. The added wall thickness of this (typically steel) cup offsets much of the advantage gained by the use of the lightweight synthetic rope fibers.

Another disadvantage is that local abrasion occurs at the portion of the rope near the smaller diameter opening of the tapered bore of the cup as tensile forces are applied to and removed from the cup. The cyclical application and removal of tensile forces causes the strands and fibers of the portion of the rope near the smaller diameter opening of the tapered bore of the cup to stretch and scrape against the cone while moving into and out of the tapered bore of the cup. Thus, each time a tensile force is applied to or removed from the cup, the likelihood that the cup-and-cone rope termination will fail increases. This disadvantage is amplified when the rope has fibers made of a synthetic material (such as any of those listed above) because such synthetic material is typically less abrasion resistant than conventional materials (such as steel). Also, synthetic fibers tend to stretch more than steel fibers under load, and the additional stretch through the smaller diameter opening of the cup exacerbates fiber abrasion at that critical area.

One known type of rope termination that is formed using the rope itself without employing any mechanical components is a Brummel Eye Splice. Generally, a Brummel Eye Splice rope termination includes a double-braided portion of hollow-braided rope ending in a closed loop. The double-braided portion of the hollow-braided rope includes an outer braid portion and an inner braid portion concentric with and disposed within the outer braid portion. The Brummel Eye Splice rope termination takes advantage of the tension-contraction coupling of hollow-braided rope construction to provide the Brummel Eye Splice rope termination with sufficient strength. More specifically, as a tensile force is applied to the Brummel Eye Splice rope termination, the helical construction of the outer braid portion of the double-braided portion of the hollow-braided rope causes the outer braid portion to clamp onto the inner braid portion. FIG. 1B shows an example Brummel Eye Splice rope termination 60 formed at an end of a rope 50. The Brummel Eye Splice rope termination has a termination length $2L_{DB}$, part of which includes a double-braided portion of the rope.

The Brummel Eye Splice rope termination has certain disadvantages. The double-braided portion of the hollow-braided rope must be relatively long to ensure that the Brummel Eye Splice rope termination is sufficiently strong and will not fail when appropriate tensile forces are applied. This increases material costs (since the double-braided portion of the rope includes twice the rope as a single-braided portion of the rope) and increases the weight of the rope, which is particularly problematic in applications in which a rope having low mass is desired, such as in aeronautical or nautical applications.

This also increases the termination length of the Brummel Eye Splice rope termination. The relatively long termination length (caused by the relatively long double-braided portion) causes ropes terminated with Brummel Eye Splice rope terminations to have relatively small running length ratios, which is detrimental for certain applications. Running length ratio is the length of raw, unmodified rope divided by the termination length. Minimizing the termination length thus maximizes the running length ratio. For certain applications, such as a pneumatic launcher towrope application and a block and tackle rigging application, rope and rope termination configurations that maximize the running length ratio offer advantages over those that consume valuable running length on rope terminations. In other words, for a rope of a given length, ropes having rope terminations with shorter termination lengths have higher running length ratios and offer unique advantages for certain applications. The relatively small running length ratio of the Brummel Eye Splice rope termination thus renders it unsuitable for certain applications (such as those with space constraints).

Accordingly, there is a continuing need for new and improved rope terminations and rope termination forming systems that solve the above-described problems.

SUMMARY

Various embodiments of the present disclosure provide a hollow-braided rope having a new and improved rope termination formed therein and a new and improved rope termination system for forming the rope termination. Generally, the rope termination of the present disclosure is formed using a double-braided portion of hollow-braided rope in conjunction with a set of mechanical components of the rope termination forming system. The use of both the double-braided portion of the hollow-braided rope and the set of mechanical components causes any applied tensile forces to be distributed between the double-braided portion and the mechanical components. The distribution of any applied tensile forces between the mechanical components and the double-braided portion of the hollow-braided rope enables the mechanical components to be relatively small and lightweight, which reduces the size and weight of the rope termination without compromising strength.

More specifically, in one embodiment, the rope termination of the present disclosure is formed using a hollow-braided rope and a rope termination forming system including a rope inverter and a socket. The rope inverter includes a tapered, frustoconical outer surface, a cylindrical inner surface defining a rope receiving channel therethrough, and a rope inversion surface connecting the outer surface and the inner surface. The socket includes a (typically cylindrical) outer surface and a frustoconical inner surface having a cone angle β and defining a tapered bore through the socket.

The rope inverter is configured such that the hollow-braided rope may stretch over the outer surface of the roper inverter, invert over the rope inversion surface of the rope inverter, and pass through the rope receiving channel of the rope inverter to form the double-braided portion of the hollow-braided rope. The socket is configured to be threaded onto the double-braided portion of the rope and to receive the rope inverter within its tapered bore. When a tensile force is applied to the rope termination (and, specifically, to the socket), the strands and fibers of the portion of the hollow-braided rope stretched over the outer surface of the rope inverter are clamped between the outer surface of the rope inverter and the inner surface of the socket. The tensile force is distributed between the mechanical components (i.e., the socket and the rope inverter) and the hollow-braided rope itself (and, particularly, the double-braided portion of the hollow-braided rope).

The rope termination and rope termination forming system of the present disclosure solve the above-described problems with traditional cup-and-cone rope terminations and Brummel Eye Splice rope terminations.

Unlike known cup-and-cone rope terminations, the configuration of the rope termination of the present disclosure and the distribution of the tensile force between the mechanical components and the hollow-braided rope enable the socket to employ a relatively steep cone angle while maintaining the ability of the socket and the rope inverter to sufficiently clamp the strands and fibers of the portion of the hollow-braided rope therebetween. More specifically, the cone angle of the rope termination of the present disclosure is about four times as large as the cone angle of typical cup-and-cone rope terminations. Since the radial load experienced by the socket decreases as the cone angle increases, the socket may be made of relatively lightweight material while maintaining the ability to carry radial loads without failing. Put differently, the use of a relatively large cone angle decreases the radial load exerted on the socket, which decreases requisite socket wall thickness and, correspondingly, socket mass. In one embodiment of the rope termination of the present disclosure, the ratio of radial load experienced by the socket to tensile force applied to the socket is about 4:1 (as compared to the about 10:1 ratio of a typical cup-and-cone rope termination). That is, in this example embodiment, a 1 pound tensile force applied to the socket causes the socket to experience about a 4 pound radial load. In this example, the radial load experienced by the socket of the rope termination of the present disclosure is roughly 60% less than that the radial load experienced by the cup of a comparable cup-and-cone rope termination. Hence, if the socket were to be made of the same material as the cup, the socket could be made with 60% less wall thickness and, correspondingly, enjoy 60% weight savings as compared to the cup. In the case of certain types of pneumatic air vehicle launchers in which the piston accelerates with over 1,000 gees, a 60% weight savings of the rope termination translates to dramatically reduced peak tension during transition from the forward accelerating phase of the launch to the reverse acceleration phase. Reduction of peak rope tension means the entire system can be made lighter. The rope termination of the present disclosure is thus lightweight and streamlined as compared to known cup-and-cone rope terminations.

Additionally, the configuration of the rope termination of the present disclosure and the distribution of the tensile force between the mechanical components and the hollow-braided rope itself reduce the abrasion of the portion of the hollow-braided rope near the smaller diameter opening of the tapered bore of the socket as tensile forces are applied to and removed from the socket by about one-half as compared to typical cup-and-cone rope terminations. Specifically, because the hollow-braided rope is double-braided at this location, the outer braid portion stretches about half as much as the rope in a typical cup-and-cone rope termination. The rope termination of the present disclosure thus has a significantly longer life expectancy than that of a rope employing a typical cup-and-cone rope termination. During the rope termination process, the rope fibers may be saturated with liquid resin, and tension may be applied as the resin cures. The cured resin reduces relative motion between rope fibers and helps to further improve abrasion resistance, thereby increasing fatigue life of the termination.

Further, the termination length $L_{AB}$ of the rope termination of the present disclosure is about one-half the termination length $2L_{DB}$ of a typical Brummel Eye Splice rope termination. Additionally, the length of the double-braided portion of the hollow-braided rope of the rope termination of the present disclosure is about one-half of the length of the double-braided portion of the hollow-braided rope of a typical Brummel Eye Splice rope termination. The rope termination of the present disclosure thus uses less material (and saves associated material costs) than a typical Brummel Eye Splice rope termination and weighs less than a typical Brummel Eye Splice rope termination.

Further, the running length ratio of the rope termination of the present disclosure is significantly larger than the running length ratio of the Brummel Eye Splice rope termination, which is advantageous for space-constrained applications (such as the towrope of a pneumatic aircraft launcher). Aircraft launch requirements typically limit peak acceleration, but a minimum launch velocity must be achieved to initiate flight. Longer running length yields greater velocity without violating max acceleration limits. A towrope with a greater running length ratio requires less overall track length and associated footprint to achieve the launch objectives. Hence, a towrope termination that yields a greater running length ratio offers a competitive advantage over traditional towrope terminations (such as Brummel Eye splice or cup-and-cone rope terminations).

Additional features and advantages are described herein, and will be apparent from the following Detailed Description and the Figures.

BRIEF DESCRIPTION OF THE FIGURES

FIG. 2A is a perspective view of one embodiment of the rope termination of the present disclosure.

FIG. 2B is a side view of the rope termination of FIG. 2A.

FIG. 2C is an end-on view of the rope termination of FIG. 2A.

FIG. 2D is a cross-sectional view of the rope termination of FIG. 2A taken substantially along Line 2D-2D of FIG. 2C.

DETAILED DESCRIPTION

Figure 1A:
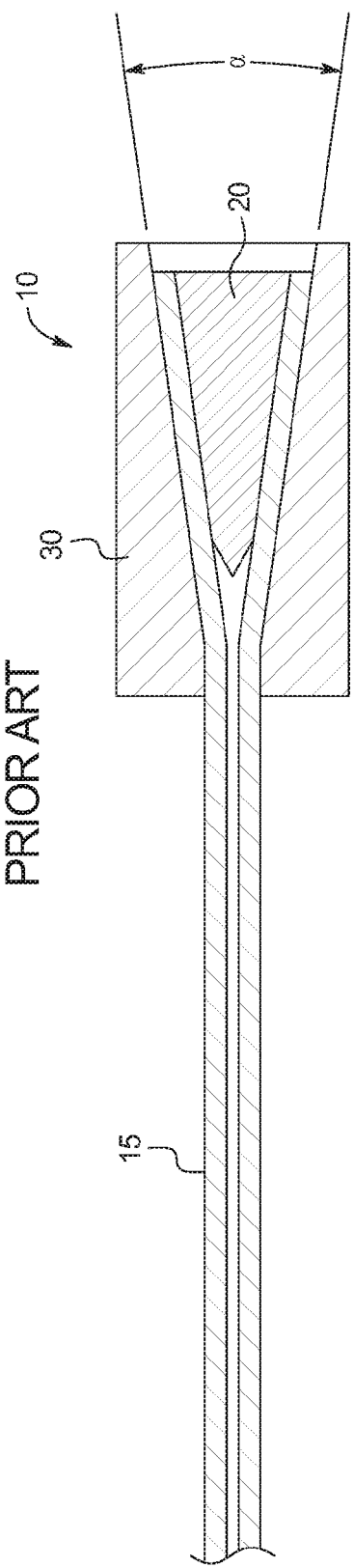
FIG. 1A is a side cross-sectional view of a known cup-and-cone rope termination.
Figure 1B:
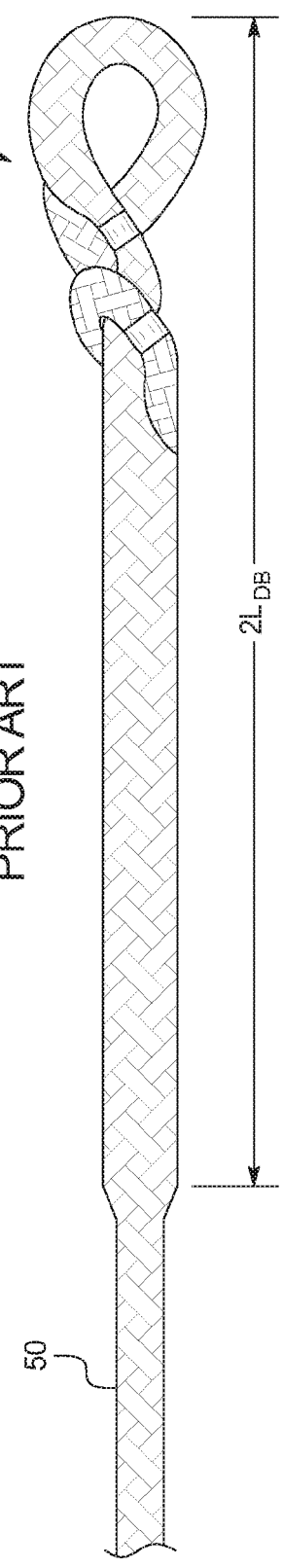
FIG. 1B is a side view of a known Brummel eye splice rope termination.
Figure 3A:
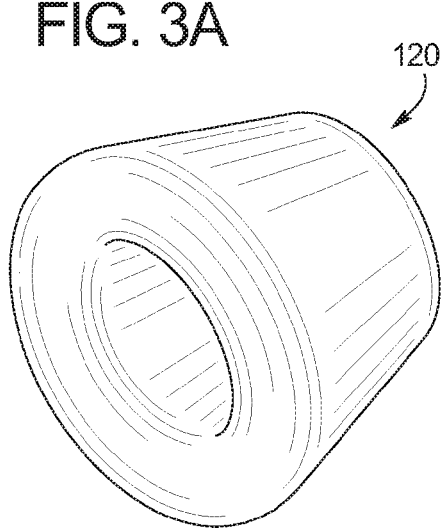
FIG. 3A is a perspective view of the rope inverter of the rope termination of FIG. 2A.
Figure 3B:
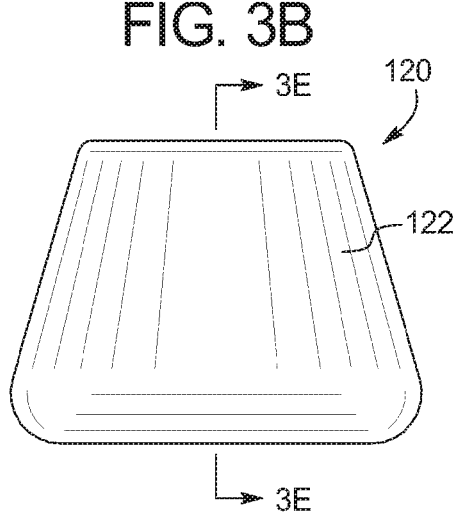
FIG. 3B is a front view of the rope inverter of FIG. 3A.
Figure 3C:
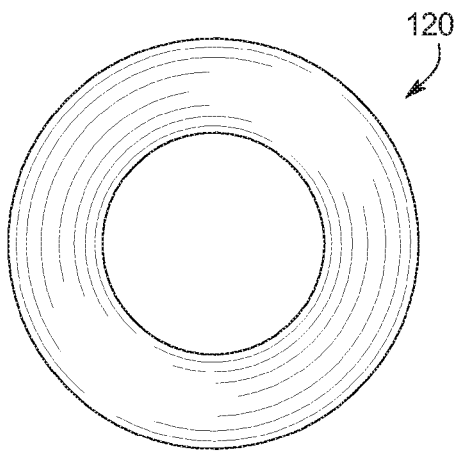
FIG. 3C is a bottom view of the rope inverter of FIG. 3A.
Figure 3D:
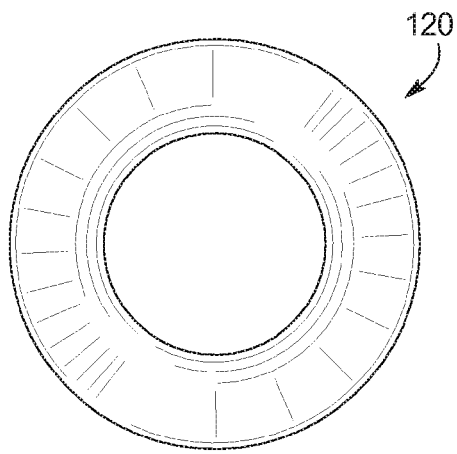
FIG. 3D is a top view of the rope inverter of FIG. 3A.
Figure 3E:
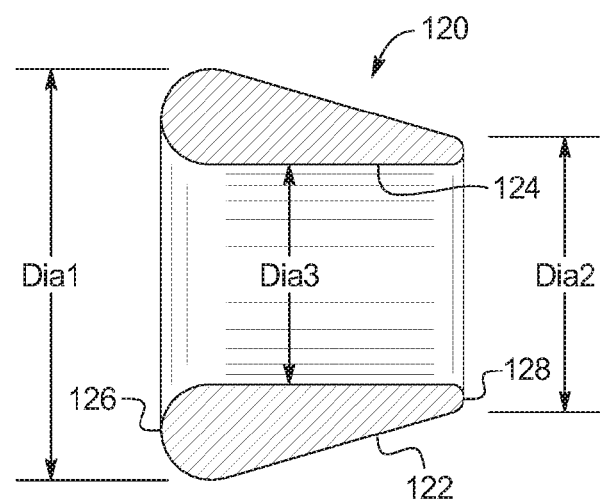
FIG. 3E is a cross-sectional view of the rope inverter of FIG. 3A taken substantially along Line 3E-3E of FIG. 3B.
Figure 4A:
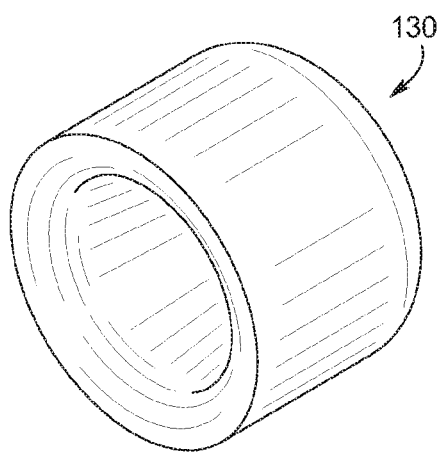
FIG. 4A is a perspective view of the socket of the rope termination of FIG. 2A.
Figure 4B:
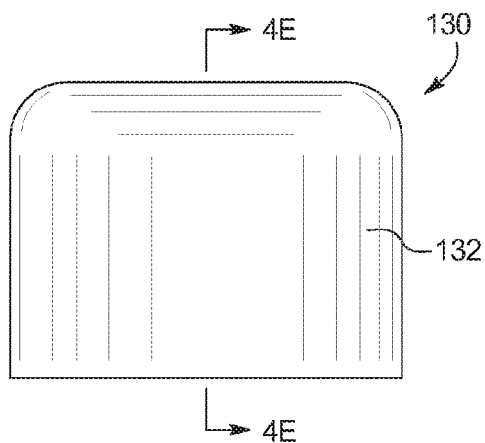
FIG. 4B is a front view of the socket of FIG. 4A.
Figure 4C:
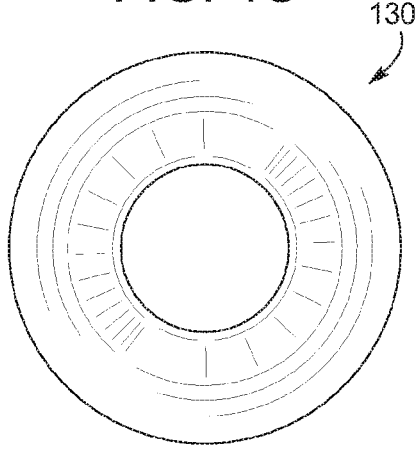
FIG. 4C is a bottom view of the socket of FIG. 4A.
Figure 4D:
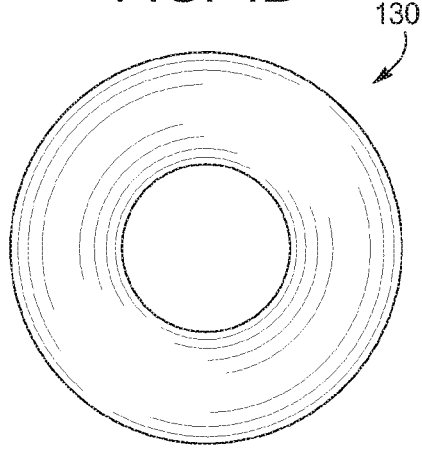
FIG. 4D is a top view of the socket of FIG. 4A.
Figure 4E:
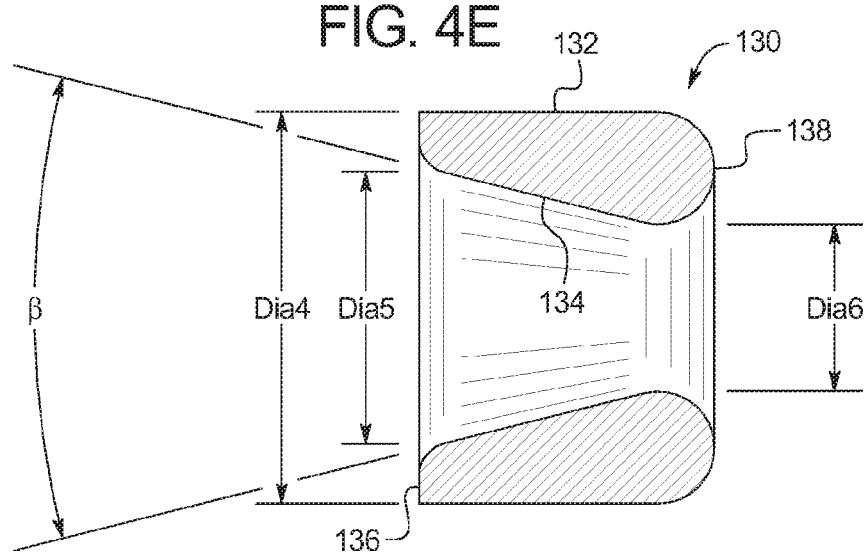
FIG. 4E is a cross-sectional view of the socket of FIG. 4A taken substantially along Line 4E-4E of FIG. 4B.

Various embodiments of the present disclosure provide a hollow-braided rope having a new and improved rope termination formed therein and a new and improved rope termination system for forming the rope termination. Generally, the rope termination of the present disclosure is formed using a double-braided portion of hollow-braided rope in conjunction with a set of mechanical components of the rope termination forming system. The use of both the double-braided portion of the hollow-braided rope and the set of mechanical components causes any applied tensile forces to be distributed between the double-braided portion and the mechanical components.

Referring now to the drawings, FIGS. 2A, 2B, 2C, and 2D illustrate one embodiment of the rope termination of the present disclosure, which is generally indicated by numeral 100, formed at an end of a length of hollow-braided rope 110. In this example embodiment, the rope termination 100 includes and is formed by a rope termination forming system including a rope inverter 120 and a socket 130.

As best shown in FIGS. 3A to 3E, the rope inverter 120 includes a rope inverter body having: (a) a tapered outer surface 122 (such as a generally frustoconical outer surface) having a maximum diameter Dia1 at a first end and a minimum diameter Dia1 at an opposing second end, (b) a generally cylindrical inner surface 124 having a diameter Dia3 and defining a generally cylindrical rope receiving channel through the rope inverter body, (c) a rounded rope inversion surface 126 connecting the first end of the outer surface of the rope inverter body and a first end of the inner surface of the rope inverter body, and (d) a second end surface 128 opposite the rope inversion surface 126 connecting the second end of the outer surface of the rope inverter body and a second end of the inner surface of the rope inverter body. For ease of assembly, the diameter Dia3 of the inner surface 124 and, therefore, the diameter of the rope receiving channel of the rope inverter, is greater than an outer diameter of the hollow-braided rope 110 (at least during the assembly process). The rope receiving channel of the rope inverter 120 is therefore sized to enable the hollow-braided rope 110 to pass through the rope receiving channel (as described below with respect to FIGS. 5A to 5M). In certain embodiments, compressive loads may cause the rope inverter to yield with permanent deformation such that subsequent disassembly and re-assembly is no longer possible.

In certain embodiments, the rope inverter body is one piece, while in other embodiments the rope inverter body is formed from multiple pieces (such as two pieces) joined together. The rope inverter may be made of any suitable material, such as (but not limited to): aluminum, titanium, steel, plastic, or fiber-reinforced plastic. It should be appreciated that the above-described shapes of the various surfaces of the rope inverter body may vary.

As best shown in FIGS. 4A to 4E, the socket 130 includes a socket body having: (a) a generally cylindrical outer surface 132 having a diameter Dia4; (b) a tapered inner surface 134 (such as a generally frustoconical inner surface) having a maximum diameter Dia5 at a first end, a minimum diameter Dia6 at an opposing second end, and a cone angle β, and defining a tapered bore through the socket body; (c) a first partially rounded end surface 136 connecting the first end of the inner surface 134 of the socket body and a first end of the outer surface 132 of the socket body; and (d) a second end surface 138 opposite the first end surface 136 and connecting the second end of the inner surface 134 of the socket body and a second end of the outer surface 132 of the socket body.

In certain embodiments, the socket body is one piece, while in other embodiments the socket body is formed from multiple pieces (such as two pieces) joined together. The socket body may be made of any suitable material, such as (but not limited to) aluminum, titanium, steel, plastic, or fiber-reinforced plastic. It should be appreciated that the above-described shapes of the various surfaces of the socket body may vary. For instance, although the outer surface of the socket body is described and illustrated as being cylindrical, in other embodiments the outer surface may take the form of a hook, a flange, an eyelet, a pulley block, a nubbin, or a ball, depending on the application.

Figure 5A:
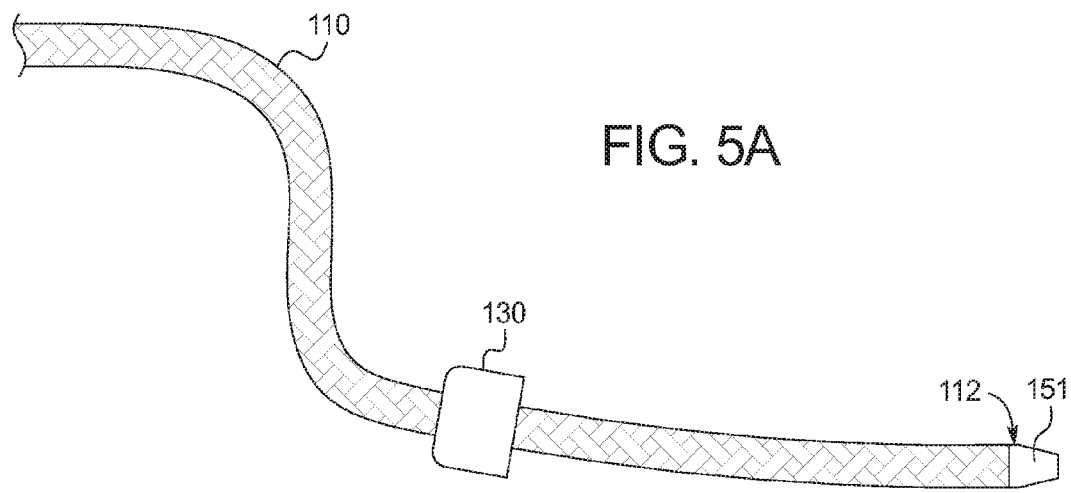
FIGS. 5A to 5M illustrate a process of using a rope termination forming system to form the rope termination of FIG. 2A.
Figure 5B:
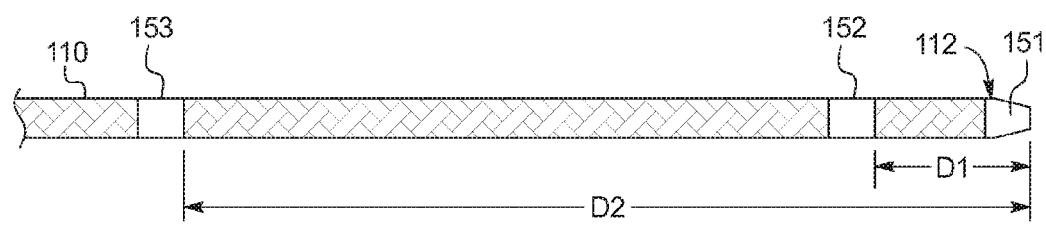
Figure 5C:
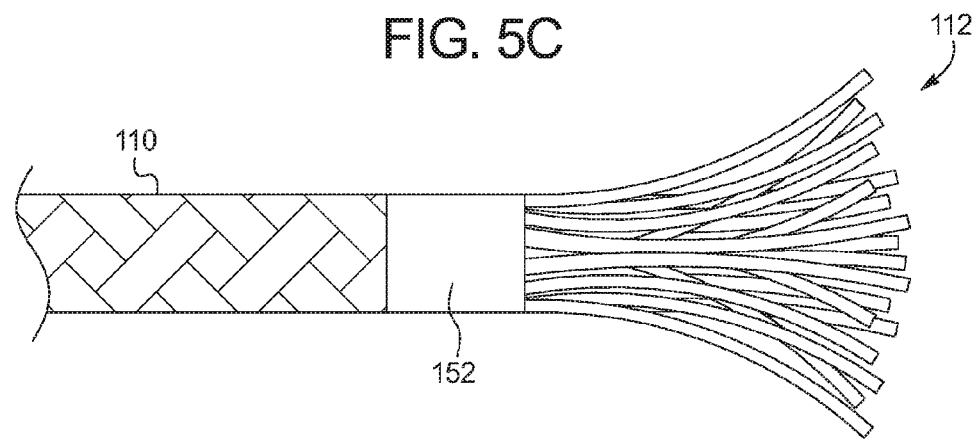

FIGS. 5A to 5M illustrate a process of using the rope termination forming system to form the rope termination 100 at an end of the hollow-braided rope 110. As illustrated in FIG. 5A, a manufacturer threads the socket 130 onto the hollow-braided rope 110. Specifically, the manufacturer: (1) binds a tail 112 of the hollow-braided rope 110 with tape 151 (though the manufacturer may bind the tail in any other suitable manner); (2) threads the tail 112 of the hollow-braided rope 110 into the tapered bore of the socket 130 proximate the second end surface 138 of the socket 130; (3) threads the tail 112 through the tapered bore of the socket 130; and (4) threads the tail 112 out of the tapered bore of the socket 130 through the opening proximate the first end surface 136 of the socket 130. As shown in FIG. 5B, the manufacturer also binds the hollow-braded rope 110: (1) at a first designated distance D1 (such as 2 inches (5.08 centimeters) or any other suitable distance) from the tail 112 with tape 152, and (2) at a second designated distance D2 (such as 14 inches (35.56 centimeters) or any other suitable distance) from the tail 112 with tape 153. As illustrated in FIG. 5C, the manufacturer then removes the tape 151 and unbraids the portion of the hollow-braided rope 110 extending between the tail 112 and the tape 152 (i.e., the binding at the first designated distance D1 from the tail in this example embodiment).

Figure 5D:
Figure 5E:
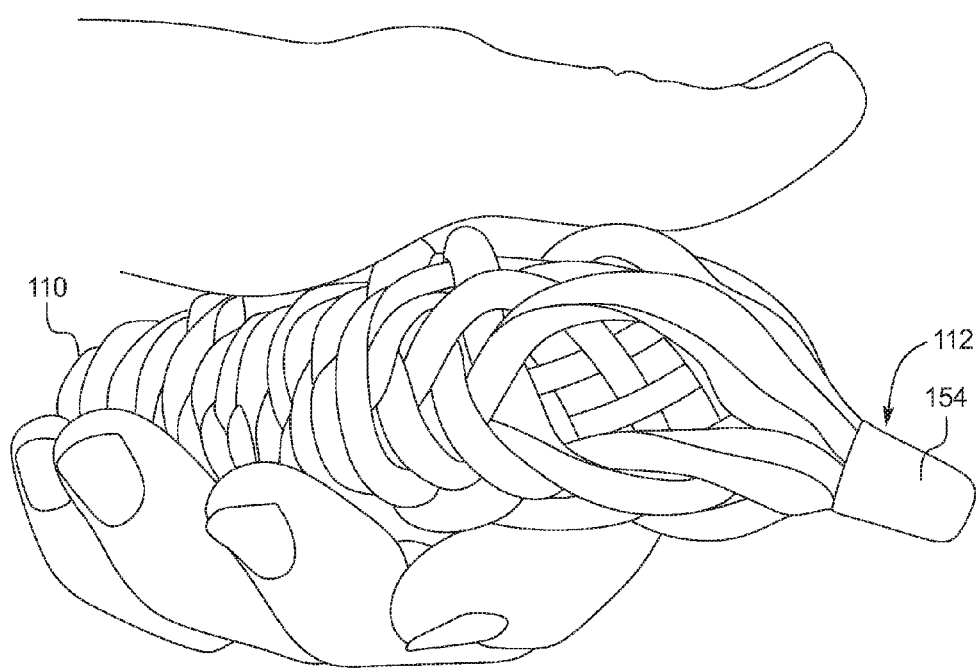

As shown in FIG. 5D, the manufacturer re-binds the tail 112 of the hollow-braided rope 110 with tape 154. As illustrated in FIG. 5E, the manufacturer removes the tape 152 and opens part of the hollow-braided rope 110 to form a cavity within the portion of the hollow-braided rope 110 extending between the tail 112 and the tape 153 (i.e., the binding at the second designated distance from the free end in this example embodiment).

Figure 5F:
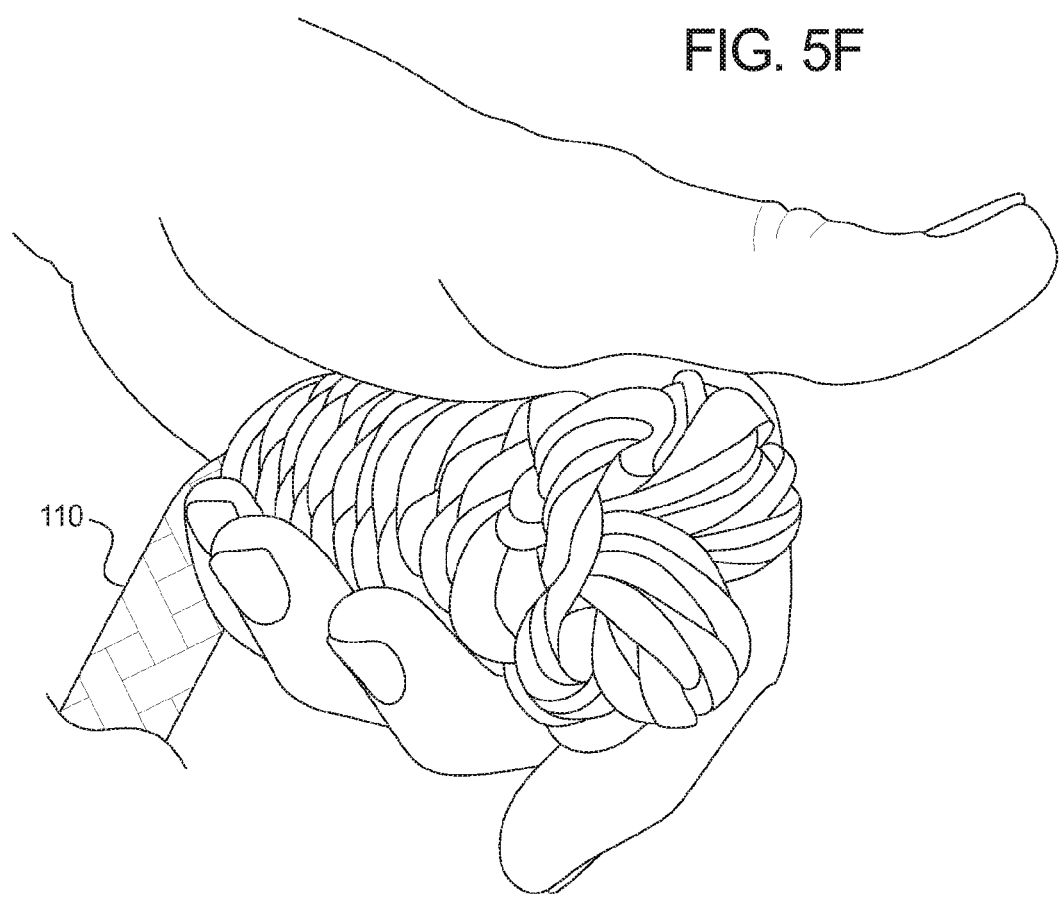
Figure 5G:
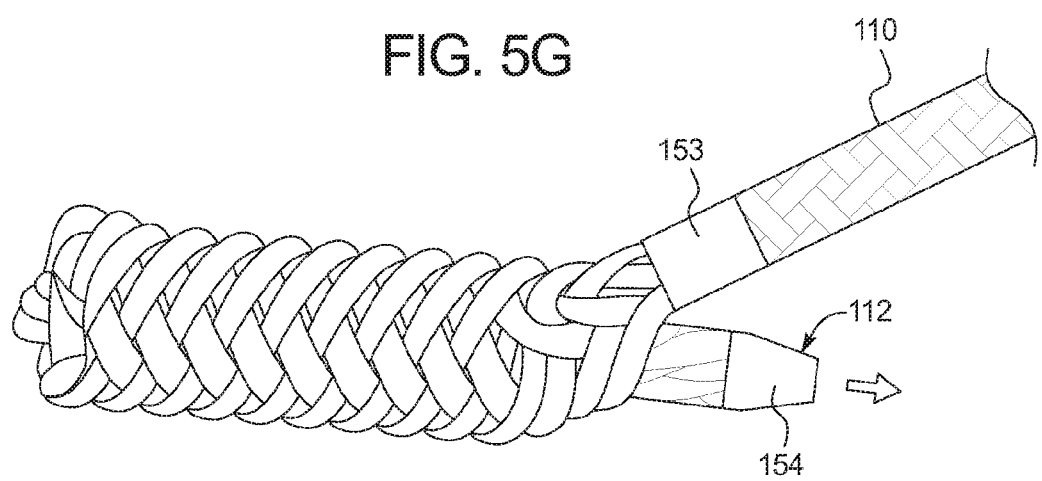
Figure 5H:
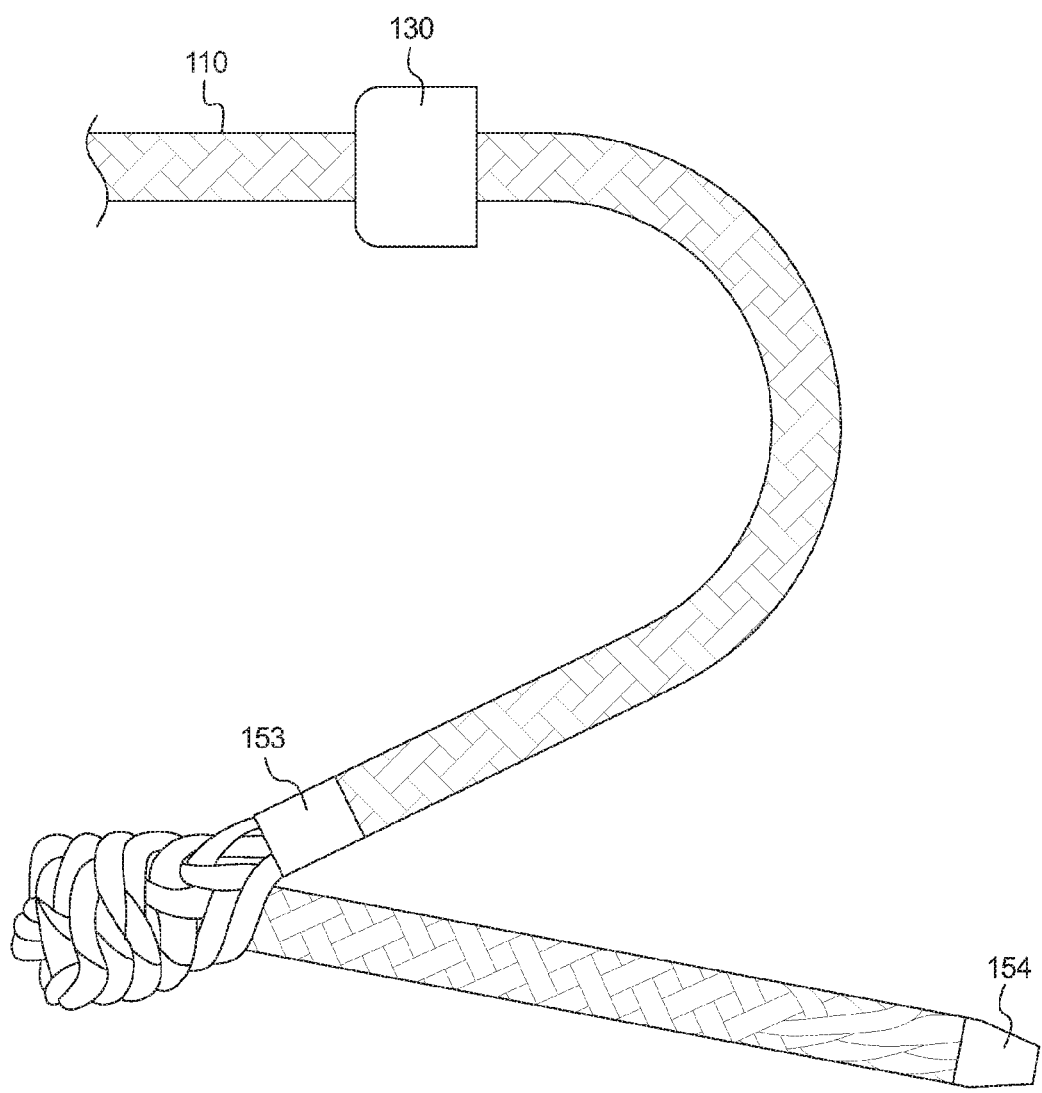

As shown in FIGS. 5F, 5G, and 5H, the manufacturer: (1) inserts the tail 112 into the cavity within the portion of the hollow-braided rope 110 extending between the tail 112 and the tape 153; (2) guides the tail 112 substantially through the cavity toward the tape 153; and (3) removes the tail 112 from the cavity proximate the tape 153 by forming an opening between the strands of the hollow-braided rope proximate the tape 153 and guiding the tail 112 through that opening and out of the cavity.

Figure 5I:
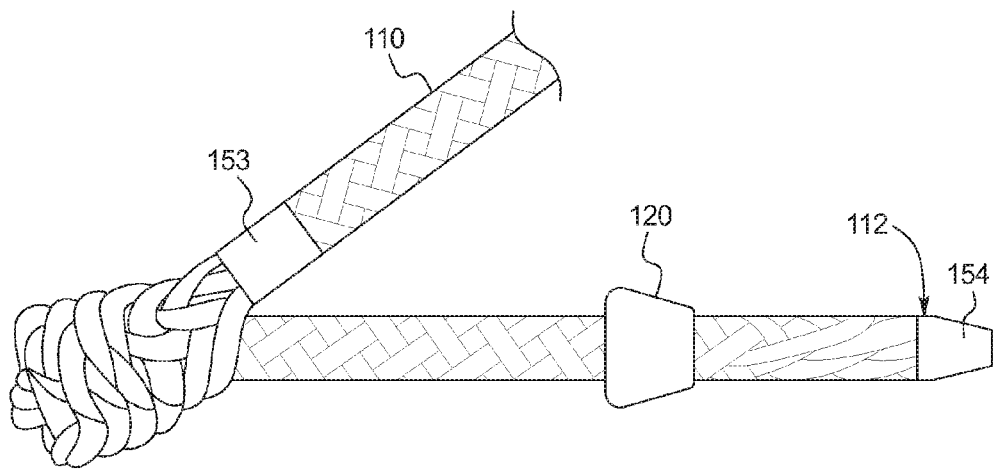

As illustrated in FIG. 5I, the manufacturer threads the rope inverter 120 onto the hollow-braided rope 110. Specifically, the manufacturer: (1) threads the tail 112 into the rope receiving channel of the rope inverter 120 through the opening proximate the rope inversion surface 126 of the rope inverter 120, threads the tail 112 through the rope receiving channel of the rope inverter 120, and threads the tail 112 out of the rope receiving channel of the rope inverter 120 through the opening proximate the end surface 128 of the rope inverter 120. The manufacturer then cuts off the unbraided portion (such as a 2 inch portion) of the hollow-braided rope 110 proximate the tail 112 (not shown), forming a new tail 113.

Figure 5J:
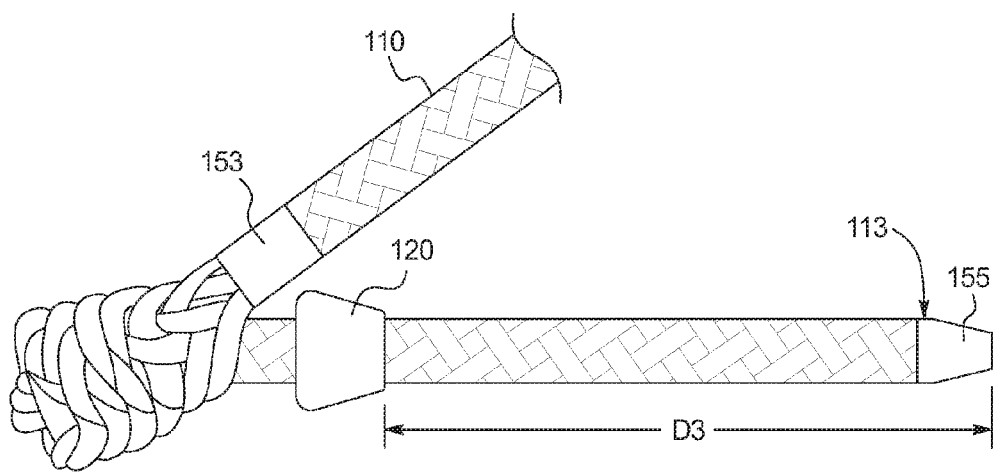
Figure 5K:
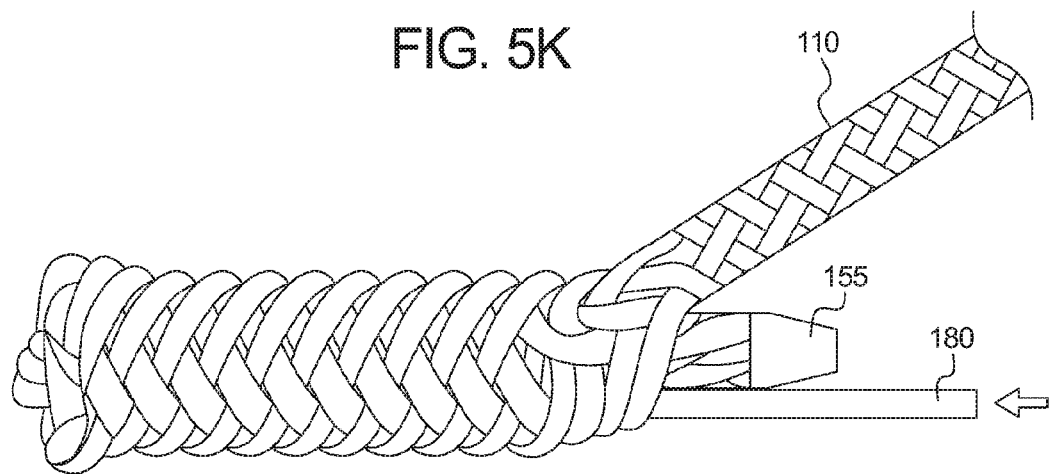

As illustrated in FIG. 5J, the manufacturer binds the tail 113 with tape 155, and positions the rope inverter 120 along the hollow-braided rope 110 relative to the tail 113 such that the end surface 128 of the rope inverter 120 is a third designated distance D3 (such as 6 inches (15.24 centimeters) or any other suitable distance) from the tail 113. As shown in FIG. 5K, the manufacturer uses a rope inverter burying tool 180 to guide the rope inverter 120 back inside the hollow-braided rope 110 through the opening between the strands from which the tail 112 emerged (as described above with respect to FIG. 5H) until the strands and fibers of a portion of the hollow-braided rope 110 wrap snugly around the rope inversion surface 126 of the rope inverter 120. The manufacturer then buries the tail 113 inside the hollow-braided rope 110.

Figure 5L:
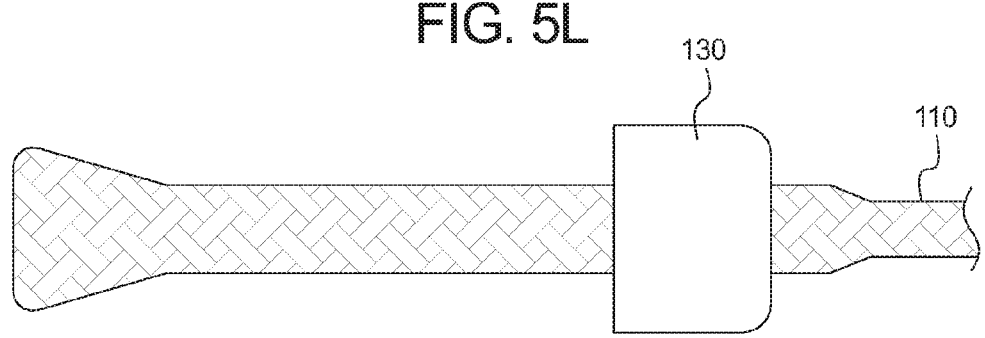
Figure 5M:
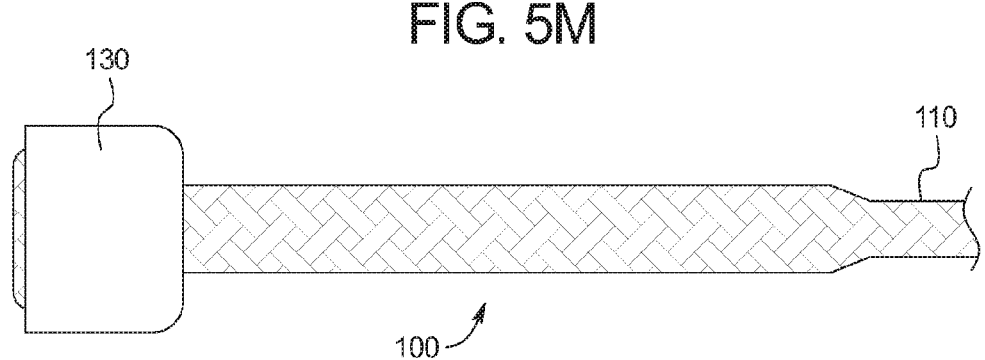

As illustrated in FIGS. 5L and 5M, the manufacturer slides the socket 130 toward the rope inverter 120 until the rope inverter 120 and the portion of the hollow-braided rope 110 wrapped around the outer surface 124 of the rope inverter 120 are received in the tapered bore of the socket 130. If the rope fibers of the termination are to be saturated with curable resin (described below), the resin may be applied at this point in the manufacturing process. The manufacturer applies sufficient load to the socket 130 to lock the socket 130 in place and clamp the strands and fibers of the portion of the hollow-braided rope wrapped around the outer surface 124 of the rope inverter 120 between the outer surface 124 of the rope inverter 120 and the inner surface 134 of the socket 130.

As best shown in FIG. 2D, after the rope termination 100 is formed, the rope termination 100 has a termination length $L_{DB}$. That is, the double-braided portion of the termination length $L_{DB}$ of the hollow-braided rope 110 includes an outer braid portion concentric with and surrounding an inner braid portion. This double-braided portion of the hollow-braided rope 110 is nearly double the strength of the single-braided portion of the hollow-braided rope 110, and the tension-contraction coupling of the hollow-braided rope causes the outer braid portion to clamp onto the inner braid portion when a tensile force is applied to the socket 130. More specifically, as a tensile force is applied to the socket 130, the helical construction of the outer braid portion of the double-braided portion of the hollow-braided rope 110 causes the outer braid portion to clamp onto the inner braid portion. This clamping action helps to transmit tension from the hollow-braided rope 110 to the tail fibers, and the resulting load-sharing helps to reduce stress and abrasion where the double braid meets the rope termination hardware.

The rope termination and rope termination forming system of the present disclosure solve the above-described problems with traditional cup-and-cone rope terminations and Brummel Eye Splice rope terminations.

Unlike known cup-and-cone rope terminations, the configuration of the rope termination of the present disclosure and the distribution of the tensile force between the mechanical components and the hollow-braided rope enable the socket to employ a relatively steep cone angle (e.g., the cone angle β indicated in FIG. 2D) while maintaining the ability of the socket and the rope inverter to sufficiently clamp the strands and fibers of the portion of the hollow-braided rope therebetween. More specifically, the cone angle of the rope termination of the present disclosure is about four times as large as the cone angle of typical cup-and-cone rope terminations. Since the radial load experienced by the socket decreases as the cone angle increases, the socket may be made of relatively lightweight material while maintaining the ability to carry radial loads without failing. Put differently, the use of a relatively large cone angle decreases the radial load exerted on the socket, which decreases requisite socket wall thickness and, correspondingly, socket mass. In one embodiment of the rope termination of the present disclosure, the ratio of radial load experienced by the socket to tensile force applied to the socket is about 4:1 (as compared to the about 10:1 ratio of a typical cup-and-cone rope termination). That is, in this example embodiment, a 1 pound tensile force applied to the socket causes the socket to experience about a 4 pound radial load. In this example, the radial load experienced by the socket of the rope termination of the present disclosure is roughly 60% less than that the radial load experienced by the cup of a comparable cup-and-cone rope termination. Hence, if the socket were to be made of the same material as the cup, the socket could be made with 60% less wall thickness and, correspondingly, enjoy 60% weight savings as compared to the cup. The rope termination of the present disclosure is thus lightweight and streamlined as compared to known cup-and-cone rope terminations.

Additionally, the configuration of the rope termination of the present disclosure and the distribution of the tensile force between the mechanical components and the hollow-braided rope itself reduce the abrasion of the portion of the hollow-braided rope near the smaller diameter opening of the tapered bore of the socket as tensile forces are applied to and removed from the socket by about one-half as compared to typical cup-and-cone rope terminations. Specifically, because the hollow-braided rope is double-braided at this location, the outer braid portion stretches about half as much as the rope in a typical cup-and-cone rope termination. The rope termination of the present disclosure thus has a significantly longer life expectancy than that of a rope employing a typical cup-and-cone rope termination.

Further, the termination length $L_{AB}$ of the rope termination of the present disclosure is about one-half the termination length $2L_{DB}$ of a typical Brummel Eye Splice rope termination. Additionally, the length of the double-braided portion of the hollow-braided rope of the rope termination of the present disclosure is about one-half of the length of the double-braided portion of the hollow-braided rope of a typical Brummel Eye Splice rope termination. The rope termination of the present disclosure thus uses less material (and saves associated material costs) than a typical Brummel Eye Splice rope termination and weighs less than a typical Brummel Eye Splice rope termination.

Figure 6A:
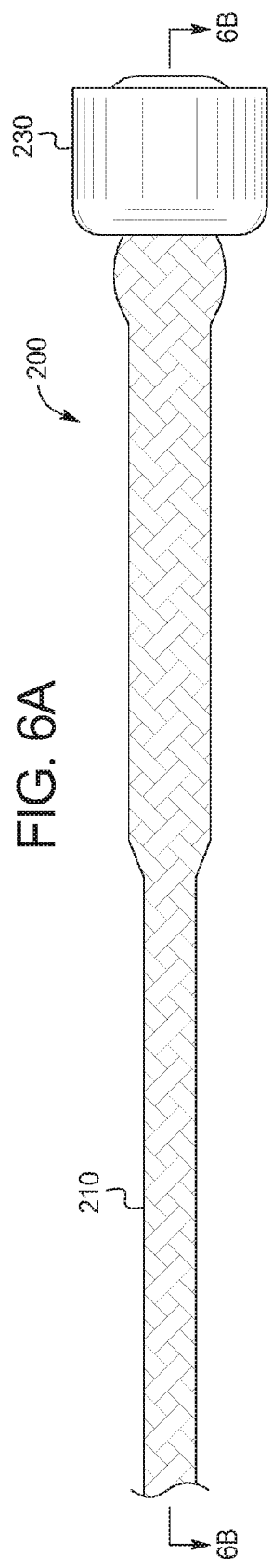
FIG. 6A is a side view of another embodiment of the rope termination of the present disclosure.
Figure 6B:
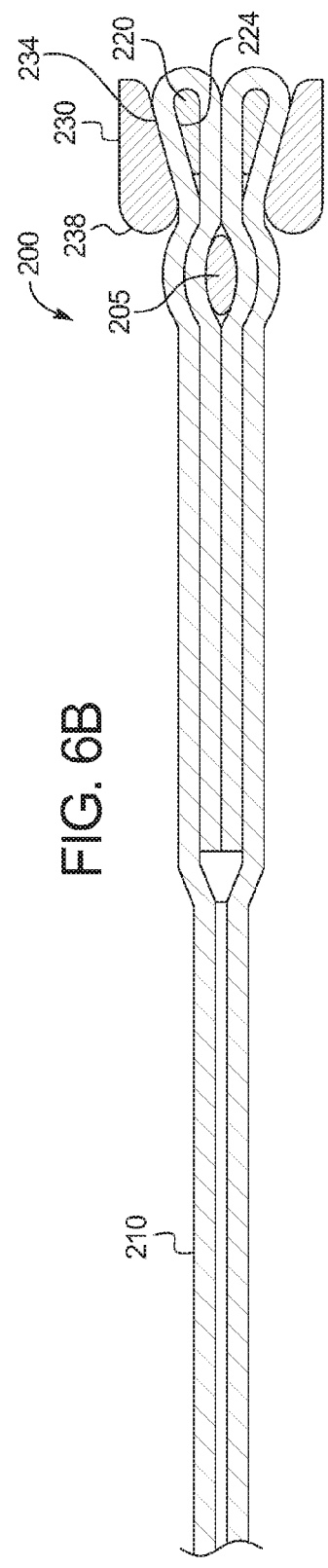
FIG. 6B is a cross-sectional view of the rope termination of the present disclosure taken substantially along Line 6B-6B of FIG. 6A.

FIGS. 6A and 6B illustrate another embodiment of the rope termination 200 of the present disclosure including a tail retainer 205 configured to substantially prevent the tail of the rope from slipping into the rope inverter 220. More specifically, in this embodiment, a manufacturer first applies sufficient tension to the socket 230 to clamp the strands and fibers of the portion of the hollow-braided rope wrapped around the outer surface 224 of the rope inverter 220 between the outer surface 224 of the rope inverter 220 and the inner surface 234 of the socket 230. The manufacturer then inserts the tail retainer 205 (which is included in the rope termination forming system in this embodiment) within the inner braid portion of the double-braided section of the hollow-braided rope 210 upstream of the second end surface 238 of the socket 230 (i.e., to the left of the second end surface 238 of the socket 230 with respect to the orientation shown in FIGS. 6A and 6B). After the tail retainer 205 is installed, the double-braided portion of the hollow-braided rope 210 proximate the socket restrainer 205 bulges radially outward such that the maximum outer diameter of the hollow-braided rope 210 around the bulged portion may become greater than the minimum diameter Dia6 of the inner surface of the socket 230. This bulge may prevent the socket 230 from moving upstream (i.e., from right to left with respect to the orientation shown in FIGS. 6A and 6B) and away from the rope inverter 220, and maintain a secure termination assembly in such cases where external loads are absent. More importantly, the bulge formed in the tail of the double braided portion of the present invention prevents the tail from working back through the rope inverter, as the tail would need to pull the tail retainer through the undersized passageway. Thus, the presence of the tail retainer provides extra clamping insurance without having to lengthen the tail portion and sacrifice running length ratio. In this example embodiment, the tail retainer is a prolate spheroid, though it should be appreciated that the tail retainer may be any suitable shape. The tail retainer 205 may be constructed of aluminum, steel, titanium, plastic, reinforced plastic, or even a short section of rope (such as that which is being terminated).

Figure 7:
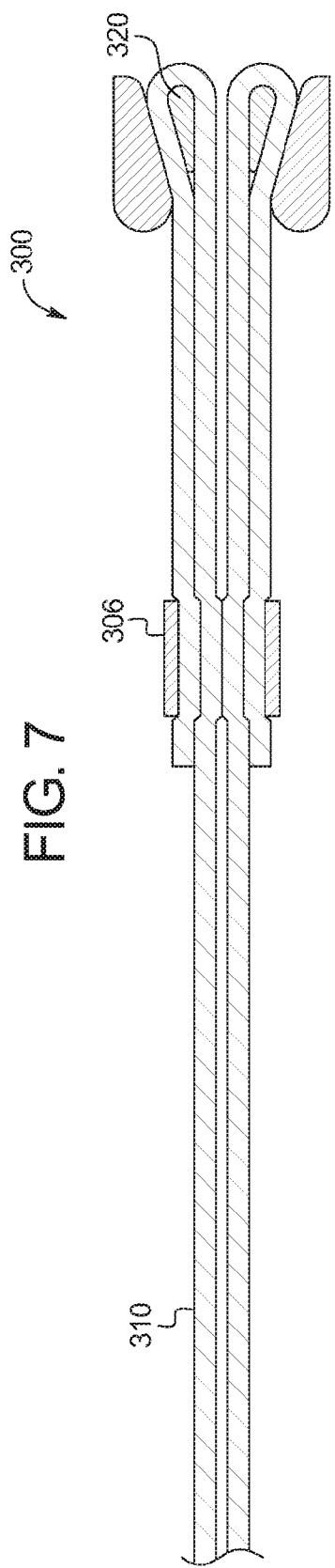
FIG. 7 is a side cross-sectional view of another embodiment of the rope termination of the present disclosure.

FIG. 7 illustrates another embodiment of the rope termination 300 of the present disclosure. Unlike the embodiments described above with respect to FIGS. 2A to 2D and 5A to 6B, in this embodiment, the rope termination 300 is formed (in part) by passing a tail of a hollow-braided rope 310 through a rope inverter 320, flaring the tail outward over an outer surface of the rope inverter 320, and securing the tail using a tail collar 306 (which is included in the rope termination forming system in this embodiment). The tail collar 306 holds the tail in place and prevents the tail from unraveling. In various embodiments, the tail collar 306 includes: adhesive-backed tape, a heat shrink, a swaged fitting (such as a swaged metal fitting), a lashing string, and/or a band. This process is simpler than the one described above with respect to FIGS. 5A to 5J by virtue of eliminating the buried tail.

Figure 8:
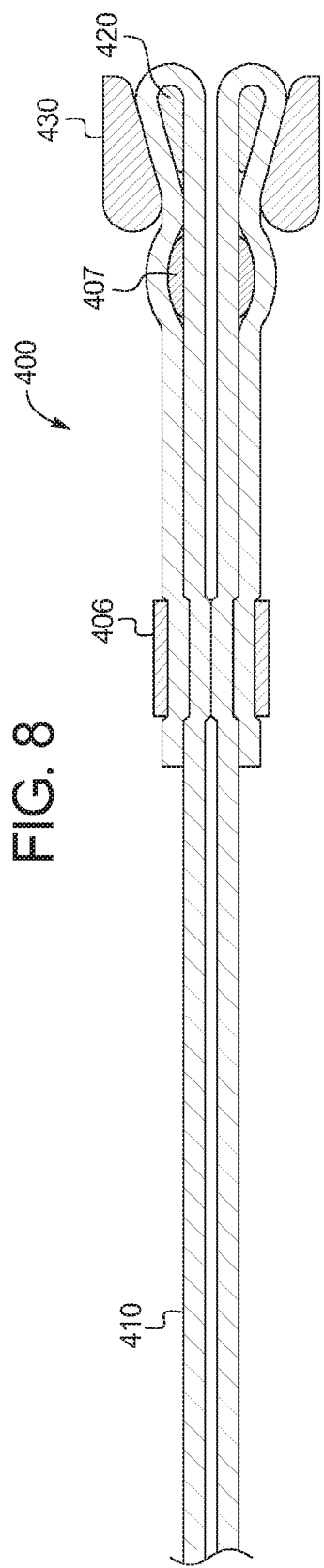
FIG. 8 is a side cross-sectional view of another embodiment of the rope termination of the present disclosure.

FIG. 8 illustrates another embodiment of the rope termination 400 of the present disclosure. The rope termination 400 is similar to the rope termination 300 described above with respect to FIG. 7, and further includes a tail retainer 407 (which is included in the rope termination forming system in this embodiment) configured to substantially prevent the tail fibers from slipping into the socket 430. The bulge that is formed by the tail retainer 407 also keeps the socket 430 from moving away from the rope inverter 420. In this embodiment, the manufacturer installs the tail retainer 407 around the inner braid portion of the double-braided section of the hollow-braided rope 410 upstream of the second end surface 438 of the socket 430 (i.e., to the left of the second end surface 438 of the socket 430 with respect to the orientation shown in FIG. 8). After the tail retainer 407 is installed, the manufacturer installs the tail collar 406 (which is included in the rope termination forming system in this embodiment). At this point, the double-braided portion of the hollow-braided rope 410 proximate the tail retainer 407 bulges radially outward such that the maximum outer diameter of the hollow-braided rope 410 around the bulged portion may be greater than the minimum diameter Dia6 of the inner surface of the socket 430. This prevents the socket 430 from moving upstream (i.e., from right to left with respect to the orientation shown in FIG. 8) and away from the rope inverter 420.

Figure 9A:
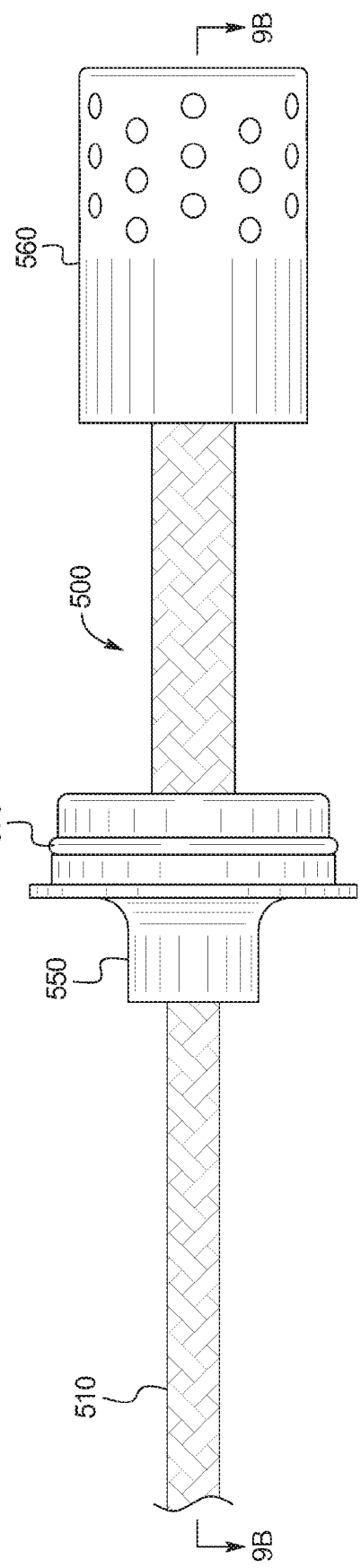
FIG. 9A is a side view of another embodiment of the rope termination of the present disclosure.
Figure 9B:
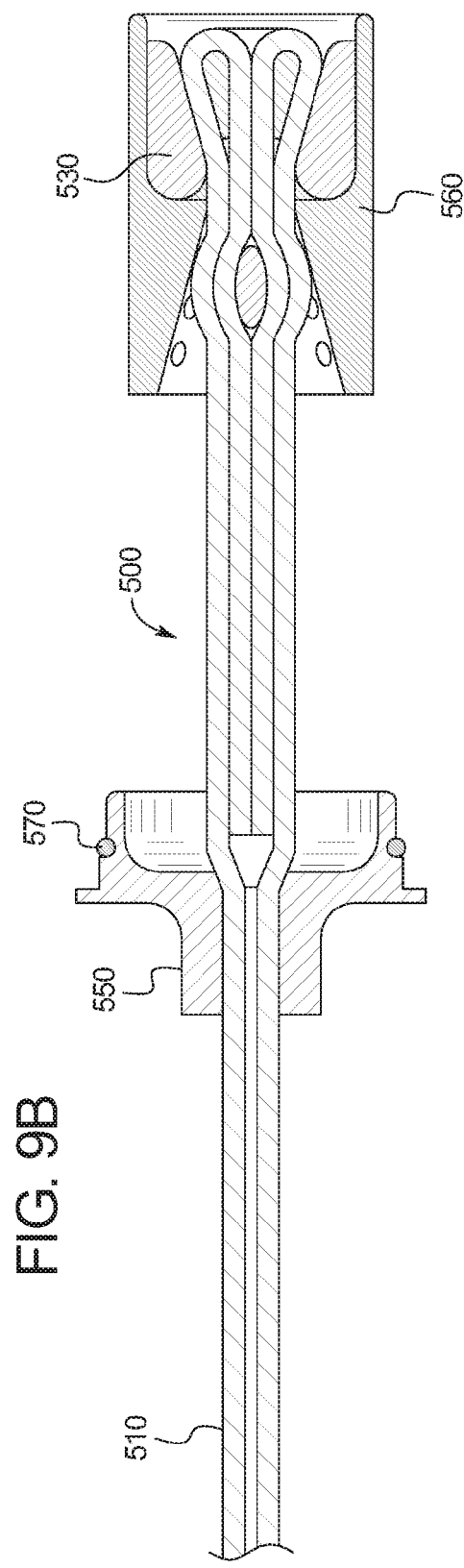
FIG. 9B is a cross-sectional view of the rope termination of the present disclosure taken substantially along Line 9B-9B of FIG. 9A.

FIGS. 9A and 9B illustrate another embodiment of the rope termination 500 of the present disclosure. The rope termination 500 is similar to the rope termination 200 described above with respect to FIGS. 6A and 6B, and further includes a piston sleeve 560 configured to receive the socket 530 therein, a rope seal 550, and an sealing member 570 (such as an O-ring).

The socket may include any suitable type of end effector that facilitates connection of the socket (and, therefore, the hollow-braided rope 510) to an appropriate device or apparatus. The end effector may be integrally formed with the socket or attachable to the socket. In one embodiment, the socket is configured such that a plurality of interchangeable end effectors may be attached to and detached from the socket, which enables the rope termination to be employed for a variety of different applications. Although not limited to these example, in various embodiments, the end effector includes one or more of the following: a nubbin, a hook, a ring, a shackle, a clevis, a pulley block, and/or a towrope piston.

It should be appreciated that the rope termination of the present disclosure may be formed in any suitable hollow-braided rope including any suitable quantity of strands (such as twelve strands) and made of any suitable material (such as synthetic material or natural material).

It should be appreciated that the rope of the present disclosure may include the rope termination of the present disclosure formed in both ends of the rope or formed in a single end of the rope. In embodiments in which the rope includes the rope termination of the present disclosure formed in a single end of the rope, the other end of the rope may include any other suitable rope termination, such as the Brummel Eye Splice rope termination.

It should be appreciated that the rope inverter may be formed from an adhesive, such as an epoxy resin, introduced during the rope termination formation process. That is, the rope inverter need not be a solid component before assembly. For example, in one example embodiment, the manufacturer follows the rope termination formation steps described above and shown in FIGS. 5A to 5H. Then, rather than sliding a solid rope inverter into place, the manufacturer applies a curing resin to the rope assembly at the inflection point and enables the resin to harden and cure. Thereafter, the manufacturer proceeds to as shown in FIG. 5M (as described above).

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A rope termination forming system for forming a rope termination in a hollow-braided rope, the rope termination system comprising:
   (a) the hollow-braided rope including (i) a first end, and (ii) an opposing second end having the rope termination formed therein, wherein the rope termination includes a double-braided portion of the hollow braided rope including an outer braid portion and an inner braid portion disposed within the outer braid portion and terminating in a tail, a portion of an outer surface of the inner braid portion near the tail contacting a portion of an inner surface of the outer braid portion;
   rope inverter including a rope inverter body having a tapered rope inverter body outer surface, a rope inverter body inner surface defining a rope receiving channel through the rope inverter body, and a rope inversion surface connecting the rope inverter body outer surface and the rope inverter body inner surface, wherein the rope inverter is configured such that: (i) a portion of the outer braid portion of the double-braided portion of the hollow-braided rope is wrapped around at least part of the rope inverter body outer surface, (ii) a portion of the inner braid portion of the double-braided portion of the hollow-braided rope is disposed within the rope receiving channel through the rope inverter body, and (iii) a portion of the double-braided portion of the hollow-braided rope is wrapped around at least part of the rope inversion surface of the rope inverter body; and
   (c) a socket including a socket body having a tapered socket body inner surface, the socket body inner surface defining a tapered bore through the socket body that forms a rope inverter receiving cavity configured to receive the rope inverter.

2. The rope termination system of claim 1, wherein the socket is configured to be slidably disposed on the hollow-braided rope and the socket body inner surface and the rope inverter body outer surface are configured to clamp the portion of the outer braid portion of the double-braided portion of the hollow-braided rope wrapped around the rope inverter body outer surface therebetween when a tensile force is applied to the rope.

3. The rope termination system of claim 1, which includes a tail retainer configured to be disposed within the inner braid portion of the double-braided portion of the hollow braided rope upstream of the socket.

4. The rope termination system of claim 1, wherein the rope inverter body is formed of a single piece and the socket body is formed of a single piece.

5. The rope termination system of claim 1, wherein the rope inverter body outer surface is frustoconical.

6. The rope termination system of claim 5, wherein the socket body inner surface is frustoconical.

7. The rope termination system of claim 6, wherein the socket body has a cylindrical socket body outer surface.

8. A hollow-braided rope comprising:
a first end; and
an opposing second end having a rope termination formed therein, the rope termination including:
  (a) a double-braided portion of the hollow braided rope including an outer braid portion and an inner braid portion disposed within the outer braid portion and terminating in a tail, a portion of an outer surface of the inner braid portion near the tail contacting a portion of an inner surface of the outer braid portion; and
  (b) a rope inverter including a rope inverter body having a tapered rope inverter body outer surface, a rope inverter body inner surface defining a rope receiving channel through the rope inverter body, and a rope inversion surface connecting the rope inverter body outer surface and the rope inverter body inner surface, wherein:
    (i) a portion of the outer braid portion of the double-braided portion of the hollow-braided rope is wrapped around at least part of the rope inverter body outer surface,
    (ii) a portion of the inner braid portion of the double-braided portion of the hollow-braided rope is disposed within the rope receiving channel through the rope inverter body, and
    (iii) a portion of the double-braided portion of the hollow-braided rope is wrapped around at least part of the rope inversion surface of the rope inverter body.

9. The hollow-braided rope of claim 8, wherein the rope termination further includes a socket including a body having a tapered socket body inner surface, the socket body inner surface defining a tapered bore through the socket body that forms a rope inverter receiving cavity configured to receive the rope inverter.

10. The hollow-braided rope of claim 9, wherein the socket is slidably disposed on the hollow-braided rope and the socket body inner surface and the rope inverter body outer surface are configured to clamp the portion of the outer braid portion of the double-braided portion of the hollow-braided rope wrapped around the rope inverter body outer surface therebetween when a tensile force is applied to the socket.

11. The hollow-braided rope of claim 10, wherein the rope termination further includes a tail retainer disposed within the inner braid portion of the double-braided portion of the hollow braided rope upstream of the socket.

12. The hollow-braided rope of claim 9, wherein the rope inverter body outer surface is frustoconical.

13. The hollow-braided rope of claim 12, wherein the socket body inner surface is frustoconical.

14. The hollow-braided rope of claim 13, wherein the socket body has a cylindrical socket body outer surface.

15. The hollow-braided rope of claim 8, wherein the first end has a different rope termination formed therein.

16. The hollow-braided rope of claim 8, wherein the rope inverter body is formed by introducing a liquid resin into the hollow-braided rope proximate the second end and enabling the liquid resin to harden.

17. A hollow-braided rope comprising:
a first end; and
an opposing second end having a rope termination formed therein, the rope termination including:
  (a) a double-braided portion of the hollow braided rope including an outer braid portion and an inner braid portion disposed within the outer braid portion and terminating in a tail, a portion of an outer surface of the inner braid portion near the tail contacting a portion of an inner surface of the outer braid portion;
  (b) a rope inverter including a rope inverter body having a frustoconical rope inverter body outer surface, a cylindrical rope inverter body inner surface defining a rope receiving channel through the rope inverter body, and a rope inversion surface connecting the rope inverter body outer surface and the rope inverter body inner surface; and
  (c) a socket including a body having a cylindrical socket body outer surface and a frustoconical socket body inner surface, the socket body inner surface defining a tapered bore through the socket body that forms a rope inverter receiving cavity configured to receive the rope inverter,
wherein:
  (i) a portion of the outer braid portion of the double-braided portion of the hollow-braided rope is wrapped around at least part of the rope inverter body outer surface,
  (ii) a portion of the inner braid portion of the double-braided portion of the hollow-braided rope is disposed within the rope receiving channel through the rope inverter body,
  (iii) a portion of the double-braided portion of the hollow-braided rope is wrapped around at least part of the rope inversion surface of the rope inverter body,
  (iv) the socket is slidably disposed on the hollow-braided rope, and
  (v) the socket body inner surface and the rope inverter body outer surface are configured to clamp the portion of the outer braid portion of the double-braided portion of the hollow-braided rope wrapped around the rope inverter body outer surface therebetween when a tensile force is applied to the socket.

* * * * *

UNITED STATES PATENT AND TRADEMARK OFFICE
CERTIFICATE OF CORRECTION

PATENT NO. : 9,873,979 B2  
APPLICATION NO. : 14/716514  
DATED : January 23, 2018  
INVENTOR(S) : Corydon C. Roeseler It is certified that error appears in the above-identified patent and that said Letters Patent is hereby corrected as shown below:

In the Claims

Column 12, Line 39    Before "rope inverter including" insert -- (b) a --

Signed and Sealed this
Thirteenth Day of March, 2018

Andrei Iancu
*Director of the United States Patent and Trademark Office*